Figure 2:
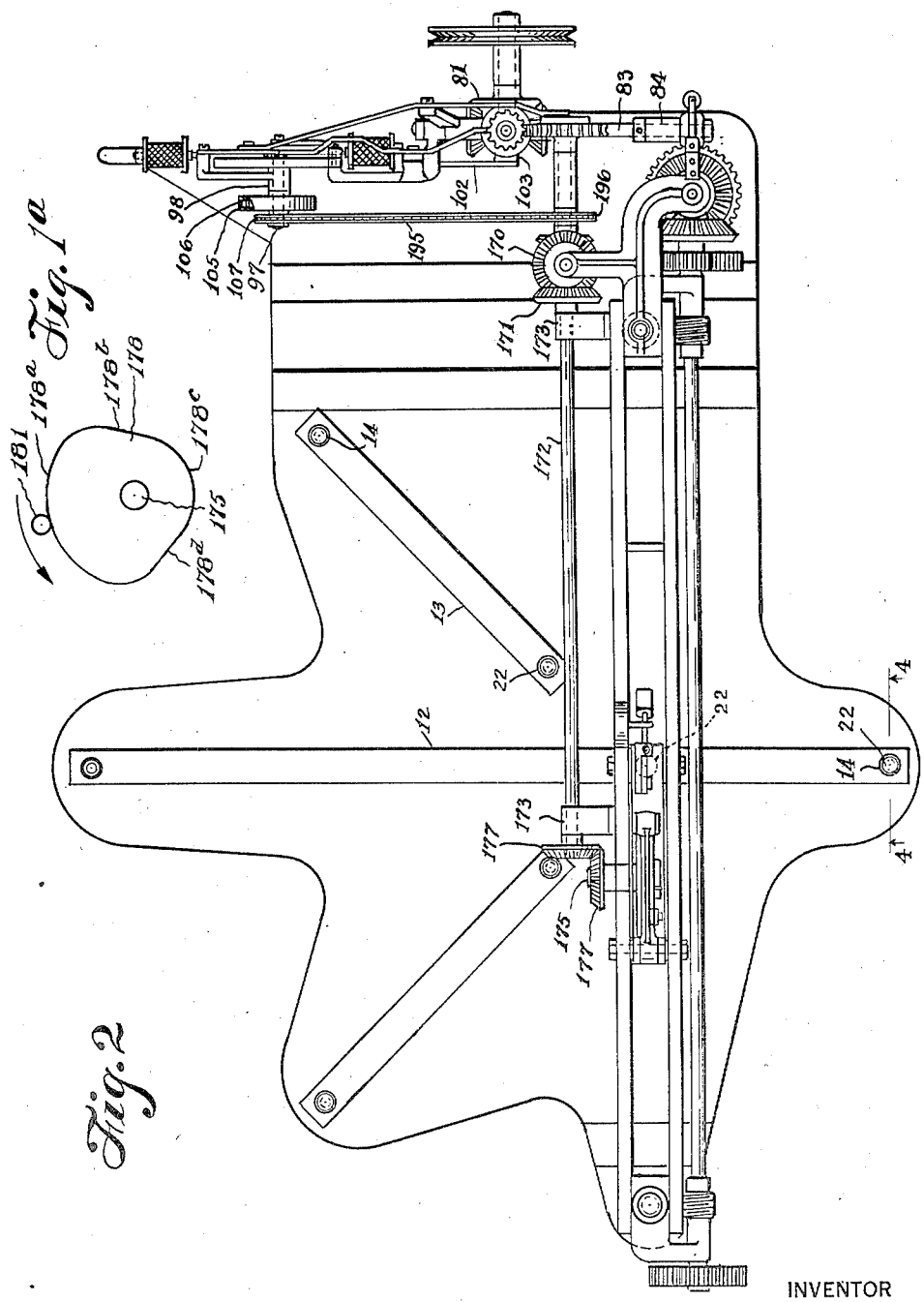

June 10, 1930. C. H. WILSON 1,762,498
HARDNESS TESTING METHOD AND APPARATUS
Filed Jan. 14, 1927 3 Sheets-Sheet 1

Fig. 1

Inventor
Charles H. Wilson,
By Attorney Harold D. Pinney

June 10, 1930.  C. H. WILSON  1,762,498
HARDNESS TESTING METHOD AND APPARATUS
Filed Jan. 14, 1927   3 Sheets-Sheet 3

INVENTOR
Charles H. Wilson,
BY
Harold D. Penney
ATTORNEY

Patented June 10, 1930

1,762,498

UNITED STATES PATENT OFFICE

CHARLES H. WILSON, OF PELHAM, NEW YORK, ASSIGNOR TO WILSON-MAEULEN COMPANY, INC., OF NEW YORK, N. Y., A CORPORATION OF NEW YORK

HARDNESS-TESTING METHOD AND APPARATUS

Application filed January 14, 1927. Serial No. 161,161.

This invention relates to machines and methods for testing the hardness of metal or like materials and more particularly to machines for testing the hardness of large or heavy articles, or structures or parts carried thereby that could not be easily handled on the type of machine having movable work supports; though it is noted that the invention is not limited to machines for heavy or bulky articles nor in some respects even to hardness testers.

One object of the invention is to provide on a machine for heavy or large objects the various improvements and automatic features provided on my automatic hardness tester shown in my United States patent application Serial No. 128,853, filed Aug. 12, 1926.

Another object of the invention is to provide in an apparatus or device of this kind an improved support suitable for receiving heavy and bulky articles.

Another object of the invention is to provide a power driven apparatus, or method of the kind above stated in which substantially all the operations, except reading and placing the objects to be tested in place are automatically performed thus permitting relatively unskilled labor and avoiding unnecessary mental and physical fatigue.

Other objects of the invention are to improve generally the simplicity, speed, accuracy and efficiency of such devices and to provide a device or apparatus of this kind which is economical, durable and reliable in operation, and economical to manufacture.

Still other objects of the invention will appear as the description proceeds; and while herein details of the invention are described and claimed, the invention is not limited to these, since many and various changes may be made without departing from the scope of the invention as claimed in the broader claims.

The inventive features for the accomplishment of these and other objects are shown herein in connection with an improved bridge type hardness testing machine which, briefly stated, includes a base supporting columns on which is carried a bridge carrying a testing point or an engagement device movable on said bridge. A bridge-raising and lowering mechanism carried by the bridge and engaging said columns is operated by means including a reversing mechanism mounted on the base and connected to the raising and lowering mechanism by means including a splined shaft. A yieldably rotated wheel mounted on said base is operatively connected to the reversing mechanism for moving it to lowering, raising and neutral positions.

A member adapted to stop said wheel in lowering position is controlled by a means actuated by the engagement device to release said yieldably rotated member, whereupon a pawl stops the wheel in neutral position and a clutch means is operated by the wheel when stopped by the pawl for bringing about rotation of a lower shaft on said base operatively connected to a major load on the bridge whereby the major load is pressed on the engagement device on rotation of the lower shaft.

Said lower shaft also, on its complete rotation, operates said pawl to release the wheel to be stopped by a reverse pawl for stopping said wheel in reversing position for raising the bridge until the bridge is sufficiently raised and the movement stopped by a means, including an adjustable member carried on said bridge, for actuating the reverse pawl.

Figure 3:
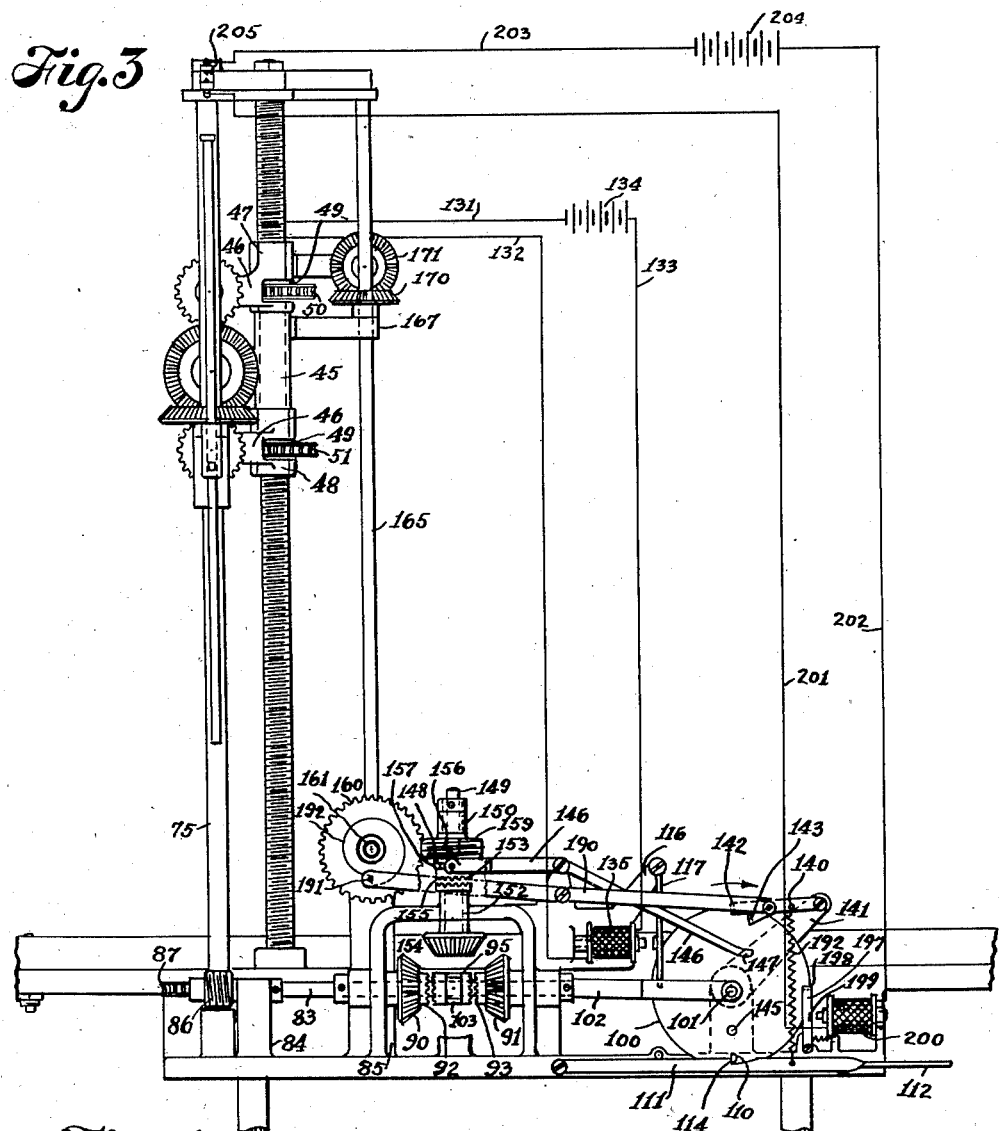
Figure 4:
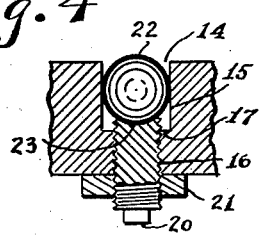

In the accompanying drawing, showing by way of example, one of many possible embodiments of the invention, Fig. 1 is a side elevation of the machine;
Fig. 1ª is an elevation of a detail;
Fig. 2 is a plan;
Fig. 3 is a fragmental end elevation, parts being removed; and
Fig. 4 is a fragmental sectional view, on a larger scale, taken on the line 4—4 of Fig. 2.

The various parts and mechanisms of my improved hardness testing machine are carried by a wide flat base 10 supported by legs 11 and having intermediate transverse ribs 12, 13 (Fig. 2) provided at their ends with deeply countersunk vertical bores 14 having smooth cylindrical upper portions 15 (Fig. 4) and lower threaded reduced portions 16 forming intermediate shoulders 17. Studs 20 held locked in said threaded portions by jamb nuts 21 on the lower ends of the studs engaging beneath the base, support hardened bearing balls 22, in seats 23, in said cylindrical portions, thereby forming bearing supports for a plate 25 (Fig. 1) to be tested or to support other pieces to be tested.

Stationary elevating threaded columns or screws 27, 28 vertically mounted in offset end portions of the base, and held by nuts 29 carry a bridge 30 comprising end blocks 31, 32 and parallel side plates 33, 34 secured at their ends to opposite sides of the end blocks. Between the side plates is located an angle piece 35 comprising a vertical web 36 secured to the side plate 34 and a horizontal web 38 provided with an upper opening 39 at the mid part of the bridge receiving a pressure rod 40 vertically movable for limited movement in said opening and provided with a lower testing point 41 adapted to engage the piece to be tested when the bridge is lowered as will be explained.

Each end block comprises a vertical main sleeve 45 slidable on the associated column, upper and lower bearing brackets 46 (Fig. 3) mounted on the ends of the sleeves, and sleeve extensions 47, 48 carried by the brackets and spaced from the main sleeve to form bearing spaces 49 therebetween in which are disposed interiorly threaded worm wheels 50, 51 received on said columns, whereby the bridge is supported, and whereby when the wheels are rotated, the testing point 41 is lowered to or raised from the test piece.

Outwardly offset connecting pieces 55, 56 (Fig. 1) connect the associate brackets 46 and are each provided with upper lower and intermediate bearing openings alined with the corresponding openings at the other end of the bridge, the upper and intermediate openings carrying upper and intermediate connecting shafts 59, 60 extending all the way across the machine; while lower short shafts 61 are received in the lower openings. Worms 62, 63 on said upper and lower shafts engage said worm wheels 50, 51 and spur gears 64 on the ends of the intermediate shaft and pinions 65 on the upper and lower shafts engaging the spur gears operatively connect the shafts whereby when the intermediate shaft 60 is rotated, as will be explained, the bridge is raised or lowered.

A base extension 70 on one end of the base has thereon a boss 71 having a lower vertical bearing bore; and a bracket extension 73 carried on the connecting piece 56 and has a vertical upper bore 74 over said lower bore. A spline shaft 75 rotatable in said lower bore and passing through the upper bore receives a miter gear 76 rotatably carried on the extension over said upper bore 74 and slidable and splined on the spline shaft and thereby constrained to rotate therewith. A miter gear 77 carried on the intermediate shaft and meshes with said gear 76, whereby said worm wheels may be rotated by the spline shaft at any position of the bridge, when the spline shaft is rotated, as will be presently explained.

A drive shaft 80 rotatably mounted transversely of said base extension 70 carries a driving bevel gear 81 on one end and a pulley 82 on the other for receiving a belt by which the drive shaft may be rotated. A horizontal worm shaft 83 (Fig. 2) disposed diametrically across said bevel gear in a bearing bracket 84 and frame 85 (Fig. 3) mounted on the side of said base extension, carries fast thereon a worm 86 engaging a lower worm wheel 87 fast on the lower end of the spline shaft 75. Lowering and raising miter pinions 90, 91 loose on said worm shaft in mesh with said driving gear are provided with inwardly pointing clutch teeth 92, 93 adapted to be engaged by a double throw horizontal clutch sleeve 95 splined on said worm shaft 83 and constrained to rotate therewith and slidable toward either of said pinions and provided with clutch teeth for engaging the teeth 92 or 93 of the pinions respectively, one to the exclusion of the other, whereby said worm shaft may be rotated in either direction and the bridge lowered or raised. The parts 81, 82 of Fig. 2 are omitted from Fig. 3 for clearness.

A crank wheel shaft 97 (Fig. 2) disposed transversely of said base extension in a bracket 98 at the rear part thereof carries fast thereon a crank wheel 100 (Fig. 3) provided with an eccentric crank pin 101 connected by means of an offset link 102 with a yoke 103 (Fig. 2) loosely mounted on said sleeve.

A spring barrel 105 fast on said crank wheel shaft carries therein a clock spring 106 having its outer end fast to the barrel and its inner end secured to a winding sprocket gear 107 loosely mounted on said crank wheel shaft and rotated as will be explained hereinafter, whereby said spring is kept tensioned for yieldably rotating said crank wheel for moving said clutch sleeve 95 from one position to the other. A stop pin 110 (Fig. 3) on the outer face of said crank wheel near the periphery thereof and disposed in lowest position when said clutch sleeve is in neutral position is held in that position by a manually operated releasing lever 111 pivoted to the edge of said base extension and having a handle end 112 projecting at the end of the base extension and provided near its rear end with a notch forming a rearwardly faced shoulder 114 engaging said stop pin to releasably hold the crank wheel against movement in said neutral position so that the raising and lowering mechanism is not actuated.

A bracket plate 116 (Fig. 3) mounted on said base extension carries an armature 117 pivoted thereto at its upper end and having its lower end downwardly disposed in position normally to engage said stop pin 110, after the stop pin has been released from said shoulder, thereby to stop said crank wheel with the clutch sleeve 95 in engagement with the lowering pinion 90, whereby the drive pinion drives the worm shaft in the direction for lowering the bridge.

An extension 120 (Fig. 1) on the upper end of said pressure rod 40 is provided with a transverse knife edge 121 intermediately engaged by a minor load lever 122 fulcrumed at its inner end on a lug 123 on the upper part of said vertical web and carrying a minor load weight 124 on the other end. An indicator 125 mounted on an upward extension of said vertical web is provided with a downwardly projecting plunger 126 engaging said minor load lever whereby, when the bridge is lowered to press the testing point against the test piece and the testing point is raised relative to the bridge, the needle of the indicator is moved, the bezel of said indicator being manually rotatable and carrying the scale of the indicator whereby the needle may be zeroized by rotating the scale when the needle is thus moved by the test piece.

A contact plate 128 mounted on the top face of said minor load lever is engageable, when the lever is raised, with a contact screw 129 adjustably disposed upon a bracket 130 above said contact plate. Conductors 131, 132, 133 (Fig. 3) connect said contact plate, contact screw, a source of current 134 and an electromagnet 135 on said magnet plate 116 in series, whereby when said minor load is raised to its limit the magnet is energized, the armature 117 attracted, and the crank wheel released and stopped in neutral position by a double faced escapement pawl 140 pivoted to a bracket 141 and provided with a pair of laterally turned upper and lower vertical stop plates 142, 143 offset from each other both vertically and horizontally and normally disposed in position for the upper stop plate 142 to engage said stop pin 110 and stop the crank wheel in position to hold the clutch sleeve 95 in neutral position, thereby to stop the downward movement of the bridge.

An actuating pin 145 on said crank wheel nearer the center thereof than said stop pin and substantially radial therewith is adapted to actuate a clutch lever 146 intermediately fulcrumed on said bracket plate and provided with a cammed end 147 engaged by said actuating pin when said stop pin is in uppermost position thereby to shift a clutch sleeve 148 on a short vertical worm shaft 149 rotatably mounted in a bearing 150 on said frame 85. A vertical clutch shaft 152 beneath and alined with the vertical worm shaft is provided with a castellated wheel 153 on its upper end, and a beveled pinion 154 on its lower end always in mesh with said driving beveled gear 81 (Fig. 1). The sleeve 48 is a single throw clutch sleeve and is slidably mounted on the lower end of said short vertical shaft 149 (Fig. 3) and constrained to rotate therewith and is provided with lower teeth 155 adapted to mesh with said castellated wheel. A yoke 156 on said clutch lever is provided with inwardly disposed rollers engageable with a lateral annular groove 157 on the castellated wheel whereby when said pin 145 is in uppermost position, said vertical clutch sleeve is lowered and operatively connects said vertical shaft 149 with said driving gear thereby to rotate this shaft.

A vertical worm 159 on the upper end of said vertical shaft meshes with a lower worm wheel 160 mounted on a lower cam shaft 161 mounted for rotation across the upper end of a bracket 162 (Fig. 1) on the base extension 70. A splined vertical load shaft 165 (Fig. 1) carried in a lower bearing 166 on said bracket 162 and an upper bearing 167 (Fig. 3) on the block 32 is operatively connected by beveled gears 168 with the lower cam shaft. A load operating beveled gear 170 rotatable on said upper bearing 167 and receiving and splined to said load operating shaft 165 meshes with a gear 171 fast on a horizontal load shaft 172 (Fig. 2) carried in brackets 173 on the rear of the bridge. A major load cam shaft 175 (Fig. 1) mounted for rotation in an extension 176 on the vertical web 36 is operatively connected by beveled gears 177 (Fig. 2) with the horizontal load shaft and carries fast thereon an accentric major load cam 178 (Fig. 1).

A major load lever 180 fulcrumed at one end on said vertical web is provided intermediately with a roller 181 resting on said cam and carries on the outer end a major load weight 182. A power lever 185 fulcrumed on the side of said vertical web near said pressure rod and having its free end linked by a link 186 to said major load lever near the fulcrum end thereof is provided on the lower face with a knife edge bearing plate 187 adapted to rest on a transverse knife edge 188 of the pressure rod 40 when said cam, load shafts, and lower worm wheel are rotated by said vertical clutch shaft when the latter is operatively connected to the driving gear thereby to permit the full major load to press on the pressure rod 40.

An intermediately fulcrumed pawl actuating lever 190 (Fig. 3) having a lateral pin 191 engaged and depressed by a stop cam 192 on said lower cam shaft, has its outer end pivotally connected with said escapement pawl 140 whereby said escapement pawl is raised and lowered during a revolution of the stop cam, thereby to disengage said upper stop plate 142 from the stop pin to permit the stop pin to pass to the lower stop plate 143 and then as the pawl at the completion of the revolution of the stop cam, is lowered, under the action of the spring 192, to permit the stop pin to pass from the lower stop plate 143 under the action of said clock spring 106 (Fig. 2).

A sprocket chain 195 (Fig. 2) carried by the sprocket wheel 107 and a sprocket wheel 196 carried by said lower cam shaft serves to wind said clock spring one turn for each turn of the lower cam shaft, thereby to retain said spring always under proper tension.

A reverse pawl 197 (Fig. 3) pivotally mounted at its lower end on said base extension is provided with a laterally turned upper end 198 adapted to be engaged by said stop pin 110 after the stop pin leaves the escapement pawl, thereby to stop the crank wheel in reversing position with the horizontal clutch sleeve 95 engaged with the reverse pinion 91 thereby to raise the bridge. An armature 199 carried by the reverse pawl is attracted by an electromagnet 200 connected by conductors 201, 202, 203 in series with a source of current 204 and a normally open switch 205 (Fig. 1) carried on an upper bracket 206 mounted on the column 28 and supporting said switch and also having bearing openings receiving the upper ends of said splined shafts 75 and 165. A bracket 209 on said bracket extension 73 has a vertical bore therein receiving a vertically adjustable reverse pin 210 held in the bore by a set screw 211 and adapted to engage and close said switch as the bridge is raised, thereby to energize the magnet 200 and attract said armature and move said laterally turned end 198 out of the path of the stop pin thereby to permit the stop pin to pass into engagement with said shoulder 114 thereby to move the horizontal clutch sleeve 95 again to neutral position and bring the bridge to rest.

The operation is as follows:

The test piece is placed upon the plate 25 or upon the balls 22, and the operator then lowers the release lever 111 to release the crank wheel stop pin 144. This permits the crank wheel 100 to turn one quarter revolution and stop when the pin reaches the armature 117, the crank wheel having thrust the crank forward and caused the clutch sleeve 95 to engage with bevel pinion 90. This operates through the worm shaft 83 and worm 86 to turn the worm wheel 87, splined shaft 75, worm wheels 50, 51 and intermediate parts to lower the bridge, bringing the testing point into contact with the piece to be tested, whereupon upward movement of the rod 40 raises the minor load until the plate 128 on the minor load lever makes contact with the contact screw 129 to close the electric circuit through the electromagnet 135 (Fig. 3). When the circuit is thus closed, the magnet 135 draws the armature 117 from the pin 110 and releases the crank wheel which turns until the stop pin 110 reaches the upper plate 142 of the double pawl. This throws the clutch sleeve 95 to neutral position and causes the clutch collar 148 to be moved by the lever 146 and into engagement with the wheel 153 by the action of the actuating pin 145 against the cammed end 147. The worm 159 now turns the worm wheel 160, the splined shaft 165, the horizontal shaft 172 (Fig. 2) and the major load cam 178 (Fig. 1) causing the major load lever 180 to lower and pressure to be applied through the link 186 and the power lever 185 to the pressure rod 40 and the test piece 25 causing the point 41 to penetrate the test piece a distance depending upon the hardness of the test piece. The continued revolution of the cam 178 raises the major load and removes the power lever from the pressure rod, and the hardness number is observed on the indicator 125.

During the revolution of the major load cam 178 the lower cam 192 (Fig. 3) on the lower shaft 161 has depressed the pin 191 and raised the pawl 140 to let the stop pin 110 move from the upper plate 142 to the lower plate 153 of the double pawl, and at the completion of one revolution of this cam 192 the pin 191 drops at the end shoulder of the cam and releases stop pin 110 and permits the crank wheel 100 to go forward and stop with the pin 110 on the end 198 of the reverse pawl 197. This movement disengages the clutch collar 148 and engages the clutch sleeve 95 with pinion 91, rotating the shaft 83, 75 and 60 and the worms 50, 51. The bridge is thus raised until pin 210 (Fig. 1) closes the switch 205, thus energizing the magnet 200 (Fig. 3), releasing the crank wheel stop pin 110 from the reverse pawl 197. The wheel 100 then makes the last quarter turn and the pin 110 comes to rest on the shoulder 114 of the release lever 111 with the sleeve 95 in the neutral position, ready to go through the same cycle again.

The machine is driven by a motor or line shaft and belt engaging the pulley 82 (Fig. 1) on the shaft 80 to which is fastened the driving gear 81 which runs continuously, and is continuously engaged with two pinions 90 and 91. The crank wheel 100 is yieldably driven through crank wheel shafts by the clock spring 106 in the barrel 105. This clock spring is wound up one revolution for every revolution of crank wheel 100 by the gears 107, 196 and chain 195, from the lower shaft 161 during its revolution in lowering and raising the major load.

While the two electric circuits herein disclosed are normally open so that the control means operate on the more economical open circuit rather than a closed circuit, it is noted that the invention is not so limited.

The plunger may be, if desired, provided with a set mark to indicate when the plunger is raised the proper amount by the minor load lever. This is easily accomplished merely by lowering the bridge and consequently lowering the testing point against a test piece until the mark on the plunger is even with the lower edge of the indicator, and then adjusting the contact screw 127 just to touch the contact plate 128.

Where a number of not very large test pieces are to be tested, it is not necessary that the bridge should be raised to the top of the columns 27, 28 after each test. For instance, suppose the test pieces are of such a size that the point 41 occupies the position 41' for testing, then it is only necessary to raise the bridge to bring the testing point to the position 41² after each test. This is easily accomplished by raising the bridge after the first test only the necessary convenient height for removing the test piece, and then adjusting the pin 210 just to close the switch at that height.

In order to give time for the initial reading of the indicator or the setting of the bezel and the final reading of the indicator for determining the hardness, the major load cam 178 may be given the shape shown in Fig. 1ª, which shows an outer land portion 178ª concentric with the axis of rotation midway of which portion the roller 181 normally engages at the beginning of the cam cycle. As the cam rotates, in the direction of the arrow, this portion 178ª holds the major load from the engagement device during an extended initial part of the rotation of the cam, to give time for the initial reading of the indicator or the setting of the bezel. Said cam has also an extended inner concentric land portion 178ᶜ on which the roller 181 does not contact but clears during an extended intermediate part of the rotation of the cam to give full time for the loaded penetrator to sink into the material of work member being tested, even though such material may require an appreciable time to flow to stability. Inclined active cam portions 178ᵇ and 178ᵈ, between said land portions 178ª and 178ᶜ, operate respectively for lowering and raising the major load between the times the roller is over said land portions. After the major load has been removed by the action of the inclined portion 178ᵈ, a second reading of the indicator is made, whereby the amount of movement of the penetrator and the hardness of the material, which are in practice functions of each other, may be easily determined.

I claim as my invention:

1. In combination, a test head; an engagement device carried thereon; a test piece support; mechanism for automatically moving said test head toward said support causing it to pause, then moving it from the support; a minor load carried on said head and adapted to press on said device; an indicator connected to said device; a major load carried on the test head; means for automatically pressing said major load on said device during the pause and then removing it; and means actuated by the moving of said test head away from the support to cause said mechanism to be disabled.

2. In a hardness testing machine, the combination of a wide flat base having downwardly offset end portions, and intermediate transverse ribs provided at their ends with deeply countersunk vertical bores having smooth cylindrical upper portions and lower threaded reduced portions forming intermediate shoulders; studs in said threaded portions having upper concaved ball seats; jamb nuts on the lower ends of the studs engaging beneath the base; hardened bearing balls in said seats in said cylindrical portions forming bearing supports for plates or other pieces to be tested; stationary elevating columns vertically mounted in said offset portions; and a test head vertically movable on said columns.

3. In combination, a bridge comprising side plates; an engagement device carried between said plates; a support; and mechanism for moving said bridge toward or from said support.

4. In combination, a base; threaded columns on said base; a bridge carried on said columns comprising end blocks slidable on the column and formed with transverse bearing spaces; brackets on said blocks; outwardly offset connecting pieces connecting the associate brackets and each provided with upper lower and intermediate bearing openings alined with the corresponding openings at the other end of the bridge; upper and intermediate connecting shafts having their opposite ends in said upper and intermediate openings; lower short shafts in the lower openings; worms on said upper and lower shafts engaging said worm wheels; spur gears on the ends of the intermediate shaft; pinions on the upper and lower shafts engaging the spur gears whereby when the intermediate shaft is rotated, the bridge is raised or lowered; means for rotating the intermediate shaft; and an engagement device on the bridge.

5. In combination, a base; threaded columns on said base; a bridge carried on said columns; an engagement device movable on said bridge; a raising and lowering mechanism carried by the bridge and including internally threaded wheels engaging said columns; connecting shafts carried by the bridge and operatively connected to said wheels; a bracket extension on one of said end blocks; a vertical splined shaft having its lower end rotatably mounted on the base; a gear rotatably carried by said extension and splined on said spline shaft and operatively connected to said connecting shaft; and a reversing mechanism on the base operatively connected to the splined shaft for operating the raising and lowering mechanism.

6. In combination, a bridge; a base; and mechanism for lowering said bridge toward said base and raising it therefrom; an engagement device movable on said bridge; a raising and lowering mechanism carried by the bridge and engaging said columns; a reversing mechanism on the base operatively connected to the raising and lowering mechanism; a yieldably rotated wheel mounted on said base and operatively connected for moving the reversing mechanism to neutral and reversing positions; a member adapted to stop said wheel in lowering position; means actuated by the engagement device to release said member; a pawl to stop the wheel in neutral position; means for releasing said pawl; and means for again stopping the wheel in neutral position.

7. In combination, a test head; a movable engagement device carried thereon; a test piece support; mechanism for automatically moving said test head toward said support causing it to pause, then moving it from the support; means controlling said mechanism including a yieldable rotated wheel; a pivoted member adapted to stop said wheel in position for lowering the head; a minor load pressing on the engagement device; and means actuated by movement of the minor load to retract said pivoted member.

8. In combination, a base; a test head; an engagement device movable on said head; mechanism for raising and lowering the head; a reversing mechanism on the base operatively connected to the raising and lowering mechanism; a yieldably rotated wheel mounted on said base and operatively connected for changing the reversing mechanism to neutral and reversing positions; a crank pin on said wheel; a bracket plate mounted on said base; an armature pivoted at its upper end to said bracket plate and having its lower end downwardly disposed in position normally to engage said stop pin; a minor load lever pivoted on said head and resting on said device; a contact plate mounted on the top face of said minor load lever; a contact screw adjustably disposed above said contact plate and engageable by the contact plate when the lever is raised; a source of current; an electromagnet on said bracket plate; and conductors connecting said contact plate, contact screw, source and magnet in series.

9. In combination, a test head; an engagement device movably carried thereon; a test piece support; mechanism for moving said test head toward said support causing it to pause, then moving it from the support; a minor load carried on said head and adapted to press on said device; an indicator connected to said device; a major load carried on the test head; means for pressing said major load on said device during the pause.

10. In combination, a base; a test head; an engagement device movable on said head; mechanism for raising and lowering the head; a reversing mechanism on the base operatively connected to the raising and lowering mechanism; a yieldably rotated wheel mounted on said base and operatively connected for changing the reversing mechanism to neutral and reversing positions; means for stopping said wheel in lowering position; a pawl to stop the wheel in neutral position; a lower shaft on said base operatively connected to said pawl to release the latter on complete rotation of the shaft; means set in operation by the wheel when stopped by said pawl for rotating the lower shaft; a major load operatively connected to the lower shaft to be pressed on the engagement device on rotation of the lower shaft.

11. In combination, a base; a test head carrying an engagement device thereon; and mechanism for moving said head toward or from said base; a major load carried on the test head; and means including splined members carried on the head and base respectively for automatically pressing said major load on said device and then removing it.

12. In combination, a test head; a yieldable engagement device carried thereon; a base forming a test piece support; mechanism for automatically moving said test head toward said support causing it to pause, then moving it from the support; an indicator connected to said device; a major load carried on the test head; and means in part carried by said base for automatically pressing said major load on said device during the pause and then removing it.

13. In combination, a base; a bridge carrying a movable engagement device; mechanism for moving said bridge toward said base causing it to pause and then moving it from said base; an extension on said bridge; a lower shaft carried on the base; a splined vertical load shaft carried by said base and extension and operatively connected with the lower shaft; a load operating gear rotatably carried by said extension and splined to said load operating shaft; a major load cam shaft rotatably carried on the bridge and operatively connected to the load operating gear; a major load cam on said cam shaft; a major load resting on said load cam and adapted to press on said device; and means for rotating the lower shaft.

14. In combination, a test head; a yieldable pressure device carried thereon; a test piece support; mechanism for automatically lowering said test head toward said support causing it to pause, then raising it from the support; an indicator connected to said device; a major load carried on the test head; and means for automatically pressing said major load on said device during the pause and then removing it.

15. In combination, a bridge comprising side plates; a base support; and mechanism for moving said bridge toward or from said support; an angle plate carried by said bridge between the side plates thereof and comprising a vertical web secured to one of the side plates and a horizontal web provided with an opening at the mid part of the bridge; a pressure rod vertically movable for limited movement in said opening and provided with a lower testing point; and a load lever pivoted to said vertical web and pressing on said rod.

16. In combination, a base; a test head; an engagement device movable on said head; mechanism for raising and lowering the head; a reversing mechanism on the base operatively connected to the raising and lowering mechanism; a rotatable wheel mounted on said base and operatively connected for changing the reversing mechanism to neutral and reversing positions; a spring for yieldably rotating the wheel; means for stopping said wheel in lowering position; a pawl to stop the wheel in neutral position; a lower shaft on said base operatively connected to said pawl to release the latter on complete rotation of the shaft; means set in operation by the wheel stopped by said pawl for rotating the lower shaft; a major load operatively connected to the lower shaft to be pressed on the engagement device on rotation of the lower shaft; and means rotated by said lower shaft for keeping the spring under tension.

17. In combination, a bridge carrying an engagement device; a base support; and mechanism for moving said bridge toward or from said support; means including a rotative member to control said mechanism; a reverse pawl for stopping said member in reversing position; and means including an adjustable member carried on said bridge for actuating the reverse pawl.

18. In combination, an engagement member; a support member; a mechanism for relatively moving said members toward or from each other; means for controlling said mechanism comprising a yieldably rotated wheel; a pawl adapted to stop said means in position to operate said mechanism; an armature carried by the pawl; an electromagnet for attracting said armature; a normally open switch connected in series with said magnet; a bracket mounted on one of the members and supporting said switch; a bracket on said bracket and the other member and having a bore therein; an adjustable reverse pin held in said bore and adapted to engage and close said switch as the members move, thereby to energize the magnet and attract said armature and move said pawl and release the wheel to permit it to pass to neutral position.

19. In combination, an engagement member engageable with a work-piece to be tested; a major load lever carrying a major load; a roller on said lever resting on said cam and adapted to press on said engagement member, whereby on rotation of the cam, the engagement member is pressed upon the work member to cause movement of said members one toward the other; an indicator for indicating the limits of the said movement; means for setting said cam in rotation substantially as said minor load is engaged with the workpiece; said cam having an outer land portion substantially concentric with its axis of rotation on which the roller engages to hold the major load from the engagement device during an extended initial part of the rotation of the cam, an extended inner concentric land portion on which the roller engages to apply the major load during an extended intermediate part of the rotation, and inclined active portions of the cam between said outer and inner portions to apply and remove the major load from the engagement device.

20. In an apparatus for testing hardness, the combination of an engagement member; means for causing relative movement of said member and a work-member to be tested one toward the other, causing them to pause and then causing relative movement thereof away from each other; means for applying a minor load to one of said members during the pause for causing one of the members to press upon the other; a major load adapted to press said members together to cause additional relative movement; an indicator for ascertaining the limits of said movement; means automatically set in operation substantially as said minor load is applied to hold the major load against application for an extended period to give time for an initial reading of the indicator, and to apply the major load during a succeeding extended period to give time for the engagement member to sink, and then to remove the major load to permit the reading of the indicator thereby to determine the amount of movement of the engagement member and the hardness of the work member.

21. In combination, an engagement member; means for relatively moving said member and a work-member to be tested one toward the other, causing them to pause and then moving them from each other; means for applying a minor load to one of said members during the pause for causing one of the members to press upon the other; a major load adapted to press said members together to cause additional relative movement; an indicator for indicating the limits of said movement; means automatically set in operation substantially as said minor load is applied including a cam having a land portion to hold the major load from pressing on the engagement device for an extended period to give time for an initial reading of the indicator, a land portion to permit the major load to be applied during a succeeding extended period, and a portion to remove the major load to permit the reading of the indicator, thereby to determine the amount of movement of the engagement member and the hardness of the work member.

22. In an apparatus for testing hardness, the combination of an engagement member; means for causing relative movement of said member and a work member to be tested one toward the other, causing them to pause and then causing relative movement thereof away from each other; means for applying a minor load to one of said members during the pause for causing one of the members to press upon the other; a major load adapted to press said members together to cause additional relative movement; an indicator for ascertaining the limits of said movement; means for holding the major load stationary while the minor load is applied, thereby to hold the major load against application for an extended period to give time for an initial reading of the indicator, said last named means serving to apply the major load during a succeeding extended period to give time for the engagement member to sink, and then to remove the major load and to again hold the major load stationary while the minor load is still applied to permit the reading of the indicator thereby to determine the amount of movement of the engagement member and the hardness of the work member.

23. In an apparatus for testing hardness, the combination of an engagement member; means for causing relative movement of said member and a work member to be tested one toward the other, causing them to pause and then causing relative movement thereof away from each other; means for applying a minor load to one of said members during the pause for causing one of the members to press upon the other; a major load adapted to press said members together to cause additional relative movement; an indicator for ascertaining the limits of said movement; means automatically set in operation substantially as said minor load is applied to hold the major load stationary and against application for an extended period while the minor load is applied to give time for an initial reading of the indicator, and to apply the major load during a succeeding extended period to give time for the engagement member to sink, and then to remove the major load and to again hold the major load stationary while the minor load is still applied to permit the reading of the indicator thereby to determine the amount of movement of the engagement member and the hardness of the work member.

24. A method for testing hardness comprising causing relative movement of an engagement member and a work member to be tested one toward the other, causing them to pause and then causing relative movement therof away from each other; applying a minor load to one of said members during the pause for causing one of the members to press upon the other; holding a major load stationary and withholding from application after said minor load is applied for an extended period to give time for an initial determination of the penetration of the engagement member; then applying the major load to one of said members during a succeding extended period to cause and give time for the engagement member to sink; and then removing the major load and again holding it stationary to permit measuring the amount of sinking for determining the hardness therefrom.

Signed at New York, in the county of Bronx and State of New York, this fourth day of January A. D. 1927.

CHARLES H. WILSON.